(12) United States Patent
Kim

(10) Patent No.: US 10,578,707 B2
(45) Date of Patent: Mar. 3, 2020

(54) RADAR APPARATUS AND METHOD FOR PROCESSING RADAR SIGNAL

(71) Applicant: MANDO CORPORATION, Gyeonggi-do (KR)

(72) Inventor: Su Han Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 339 days.

(21) Appl. No.: 15/623,349

(22) Filed: Jun. 14, 2017

(65) Prior Publication Data

US 2017/0363713 A1 Dec. 21, 2017

(30) Foreign Application Priority Data

Jun. 20, 2016 (KR) .......................... 10-2016-0076250

(51) Int. Cl.

| | |
|---|---|
| *G01S 7/02* | (2006.01) |
| *G01S 13/93* | (2006.01) |
| *G01S 7/03* | (2006.01) |
| *H01Q 1/32* | (2006.01) |
| *H01Q 15/14* | (2006.01) |
| *H01Q 21/00* | (2006.01) |

(Continued)

(52) U.S. Cl.
CPC ................ *G01S 7/024* (2013.01); *G01S 7/03* (2013.01); *G01S 13/931* (2013.01);
(Continued)

(58) Field of Classification Search
CPC .......... G01S 7/024; G01S 13/931; G01S 7/03; H01Q 1/3233; H01Q 15/14; H01Q 21/0075; H01Q 21/245
(Continued)

(56) References Cited

U.S. PATENT DOCUMENTS

| | | | | |
|---|---|---|---|---|
| 5,163,176 A | * | 11/1992 | Flumerfelt | ............ G01S 7/2813 342/174 |
| 6,091,373 A | * | 7/2000 | Raguenet | ............. H01Q 9/0414 333/137 |

(Continued)

*Primary Examiner* — Frank J McGue
(74) *Attorney, Agent, or Firm* — Ladas & Parry, LLP

(57) ABSTRACT

The present disclosure relates to a radar apparatus and a method for processing a signal using a radar apparatus, and more particularly, to an apparatus and a method for receiving and processing reception signals having different polarization characteristics using one array antenna. Specifically, the present disclosure provides a radar apparatus including: a long-range transmission antenna unit including one or more long-range transmission array antennae which transmit a first polarized transmission signal; a short-range transmission antenna unit including one or more short-range transmission array antennae which transmit a second polarized transmission signal; a complex array antenna unit which includes one or more complex array antennae receiving a first polarized reception signal and a second polarized reception signal which are received by reflecting the first polarized transmission signal and the second polarized transmission signal from a target; and a signal processing unit which detects the target using the first polarized reception signal and the second polarized reception signal, in which the first polarized reception signal has a cross polarization characteristic with respect to the second polarized reception signal, and a radar signal processing method.

15 Claims, 9 Drawing Sheets

(51) Int. Cl.
*H01Q 21/24* (2006.01)
*G01S 13/931* (2020.01)

(52) U.S. Cl.
CPC ........... *H01Q 1/3233* (2013.01); *H01Q 15/14* (2013.01); *H01Q 21/0075* (2013.01); *H01Q 21/245* (2013.01)

(58) Field of Classification Search
USPC ........................................................ 342/188
See application file for complete search history.

(56) References Cited

U.S. PATENT DOCUMENTS

| | | | | |
|---|---|---|---|---|
| 6,777,684 B1* | 8/2004 | Volkov | ............... | G01N 21/3581 |
| | | | | 250/341.1 |
| 7,009,551 B1* | 3/2006 | Sapletal | .................. | G01S 7/025 |
| | | | | 342/70 |
| 7,830,301 B2* | 11/2010 | Margomenos | ............ | G01S 7/03 |
| | | | | 342/175 |
| 8,786,496 B2* | 7/2014 | Rida | .................... | H01Q 1/3233 |
| | | | | 343/700 MS |
| 2008/0117099 A1* | 5/2008 | Walter | .................... | G01S 7/032 |
| | | | | 342/25 R |
| 2011/0267217 A1* | 11/2011 | Hildebrandt | ............ | G01S 7/032 |
| | | | | 342/70 |
| 2013/0027269 A1* | 1/2013 | Orime | ...................... | G01S 7/032 |
| | | | | 343/841 |
| 2016/0195607 A1* | 7/2016 | Roulston | ................. | G01S 7/025 |
| | | | | 342/188 |

* cited by examiner

RADAR APPARATUS AND METHOD FOR PROCESSING RADAR SIGNAL

CROSS-REFERENCE TO RELATED APPLICATIONS

This application claims priority from Korean Patent Application No. 10-2016-0076250, filed on Jun. 20, 2016, which is hereby incorporated by reference for all purposes as if fully set forth herein.

BACKGROUND OF THE INVENTION

Field of the Invention

The present disclosure relates to a radar apparatus and a method for processing a signal using a radar apparatus, and more particularly, to an apparatus and a method for receiving and processing reception signals having different polarization characteristics using one array antenna.

Description of the Related Art

A radar technology refers to a technology which detects a target using a reception signal which is received by reflecting a signal transmitted by a transmission antenna of radar apparatus from a target and obtains information on the target.

Such a radar technology is being used in various fields such as a vehicle, an aircraft, or a military purpose. Specifically, a radar apparatus for a vehicle has been developed to be mounted in the vehicle in recent years so that an application range of the radar technology is gradually widening. Further, since the radar apparatus is mounted in the vehicle, development of a small size and low costs radar is proceeding.

However, in the case of a radar apparatus for a vehicle, as the size of the radar is reduced, an antenna implementing space is downsized and interference problem may be caused due to antenna output implementation and transmission and reception in a proximity space.

In the meantime, the radar apparatus for a vehicle includes a long-range antenna for detecting a target located at a long distance and a short-range antenna for detecting a target at a short distance. However, the long-range antenna and the short-range antenna are implemented using signals having the same polarization characteristic for convenience of design and verification.

Therefore, even though the radar apparatus for a vehicle of the related art is required to reduce the size of the radar apparatus, it is difficult to reduce the size of the hardware in order to configure a predetermined number of channels to ensure the performance of the radar.

SUMMARY OF THE INVENTION

The present disclosure suggests a long-range and short-range reception signal processing technique using one reception antenna, using signals having different polarization characteristics depending on a function of the antenna.

Further, the present disclosure suggests a technique which reduces the size of the radar apparatus for a vehicle by reducing the number of reception chips of the radar apparatus for a vehicle and maintains the number of channels at a predetermined level, thereby ensuring a performance of the antenna.

According to an aspect of the present disclosure, there is provided a radar apparatus including a long-range transmission antenna unit including one or more long-range transmission array antennae which transmit a first polarized transmission signal; a short-range transmission antenna unit including one or more short-range transmission array antennae which transmit a second polarized transmission signal; a complex array antenna unit which includes one or more complex array antennae receiving a first polarized reception signal and a second polarized reception signal which are received by reflecting the first polarized transmission signal and the second polarized transmission signal from a target; and a signal processing unit which detects the target using the first polarized reception signal and the second polarized reception signal, in which the first polarized reception signal has a cross polarization characteristic with respect to the second polarized reception signal.

According to another aspect of the present disclosure, there is provided a radar signal processing method including: a transmission signal transmitting step of transmitting a first polarized transmission signal using one or more long-range transmission array antennae and transmitting a second polarized transmission signal using one or more short-range transmission array antennae; a reception signal receiving step of receiving a first polarized reception signal and a second polarized reception signal which are received by reflecting the first polarized transmission signal and the second polarized transmission signal from a target by means of one complex array antenna; and a detecting step of detecting the target using the first polarized reception signal and the second polarized reception signal, in which the first polarized reception signal has a cross polarization characteristic with respect to the second polarized reception signal.

According to still another aspect of the present disclosure, there is provided a radar apparatus including: a first complex array antenna unit including a first polarization sub array antenna group including one or more first polarization sub array antennae which receive a first polarized reception signal and a second polarization sub array antenna group including one or more second polarization sub array antennae which receive a second polarized reception signal; and a second complex array antenna unit including a first polarization sub array antenna group including one or more first polarization sub array antennae which receive a first polarized reception signal and a second polarization sub array antenna group including one or more second polarization sub array antennae which receive a second polarized reception signal, in which a distance between the first polarization sub array antenna group of the first complex array antenna unit and the first polarization sub array antenna group of the second complex array antenna unit is longer than a distance between the second polarization sub array antenna group of the first complex array antenna unit and the second polarization sub array antenna group of the second complex array antenna unit.

As described above, according to the present disclosure, signals for detecting the long-range and short-range targets are configured to have different polarization characteristics to process a reception signal using one reception antenna.

Further, according to the present disclosure, the reception signal is processed using one reception antenna so that the same number of channels is maintained while reducing the reception antenna.

Further, according to the present disclosure, the size of the radar apparatus is reduced while providing the same performance.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
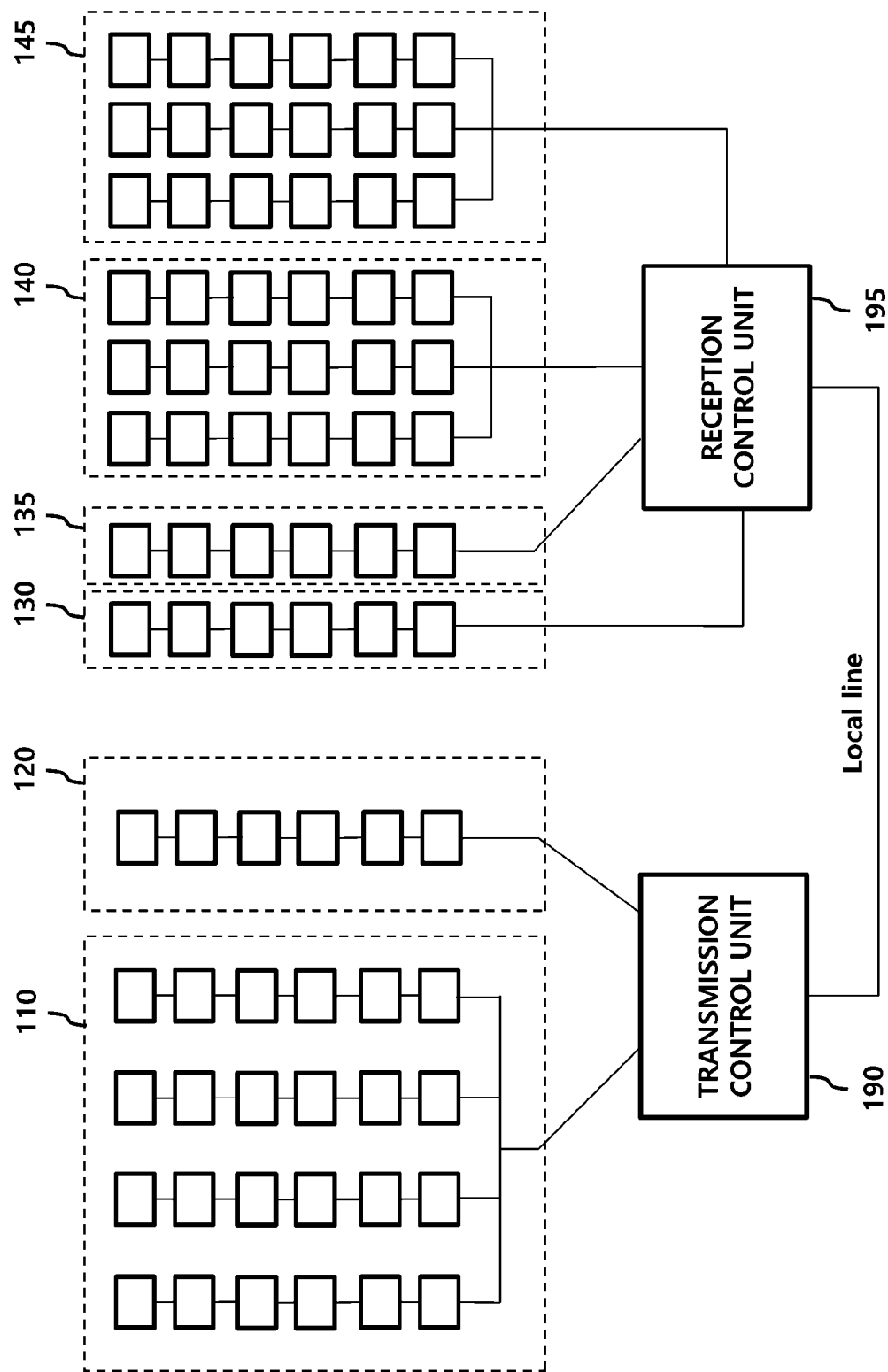
FIG. 1 is a view illustrating a configuration of a radar apparatus for a vehicle.

Hereinafter, some exemplary embodiments of the present disclosure will be described in detail with reference to the accompanying drawings. When reference numerals denote components in the drawings, even though the like components are illustrated in different drawings, it should be understood that like reference numerals refer to the same components. Furthermore, when it is judged that specific description on known configurations or functions related in the description of the present disclosure may unnecessarily obscure the essentials of the present disclosure, the detailed description will be omitted.

Further, some exemplary embodiments of the present disclosure will be described in detail with reference to the accompanying drawings. In describing components of the exemplary embodiment of the present disclosure, terminologies such as first, second, A, B, (a), (b), and the like may be used. However, such terminologies are used only to distinguish a component from another component but nature, a sequence or an order of the component is not limited by the terminologies. If it is described that a component is "connected" or "coupled" to the other component, it is understood that the component is directly connected or coupled to the other component but another component may be "connected" or "coupled" between the components.

The present disclosure discloses a radar apparatus and a radar signal processing method which may reduce a size of a hardware while maintaining a target detecting performance of the radar apparatus. Even though it is described that the radar apparatus in the specification is applied to a vehicle as an example, for the convenience of description, the radar apparatus may be applied to an aircraft, a ship, or a train. That is, the radar apparatus according to an exemplary embodiment of the present disclosure may be configured in various devices to be used, but a usage environment is not specifically limited. Further, for the convenience of description, in the present disclosure, even though frequency modulated continuous wave (FMCW) radar apparatus are mainly described, the present disclosure will be similarly applied to a CW radar apparatus and a pulse type radar apparatus. Further, in the following description, even though an array antenna which transmits and receives a signal through an arrangement of one or more patch antennae is described as an example, the present disclosure may be applied to various types of antennae which may transmit and receive a signal having a polarization characteristic.

A radar needs to detect targets in various distances. For example, a radar for a vehicle which is mounted in the vehicle may include a long-range antenna which detects a long-range target which is located far from the vehicle and a short-range antenna which detects a short-range target which is close to the vehicle. To this end, the radar apparatus for a vehicle includes an array antenna for long-range detection and an array antenna for short-range detection.

FIG. 1 is a view illustrating a configuration of a radar apparatus for a vehicle.

Referring to FIG. 1, a radar apparatus for a vehicle includes a long-range transmission antenna unit 110 which outputs a transmission signal for detecting a long-range target and a short-range transmission antenna unit 120 which outputs a transmission signal for detecting a short-range target. Further, the radar apparatus for a vehicle includes a transmission control unit 190 which controls an output of a transmission signal. Further, the radar apparatus for a vehicle includes a reception antenna which receives a reception signal which is received by reflecting a transmission signal from a target. For example, the reception antenna may be configured by one or more short-range reception antenna units 130 and 135 for receiving a short-range reception signal which is received by being reflected from a short-range target and one or more long-range reception antenna units 140 and 145 for receiving a long-range reception signal which is received by being reflected from a long-range target. Further, the radar apparatus includes a reception control unit 195 which controls the reception signal and controls operations of the reception antennae. In the meantime, the reception control unit 195 of the radar apparatus extracts the reception signal using a transmission signal so that a local line may be connected between the transmission control unit 190 and the reception control unit 195. Information on the transmission signal is transmitted to the reception control unit 195 through the local line.

In the meantime, the long-range transmission antenna unit 110 may be configured to include a plurality of sub array antennae to precisely detect a target by forming a narrow beam pattern. To the contrary, the short-range transmission antenna unit 120 may include only one sub array antenna to form a broad detection range by forming a wide beam pattern.

In the meantime, the short-range reception antenna units 130 and 135 may configure a plurality of channels to improve a performance of the radar apparatus and precisely detect the target. To this end, a signal which is transmitted by one short-range transmission antenna unit 120 is received by two short-range reception antenna units 130 and 135. Similarly, the long-range reception antenna units 140 and 145 may also be configured by two channels. To this end, the reception control unit 195 needs to be configured by four reception chips. Even though in the above description, each of the short-range reception antenna and the long-range reception antenna configures two channels, two or more channels may be configured in accordance with requirements for the radar apparatus.

As described above, in order to improve the performance of the radar apparatus, a plurality of channels needs to be configured. Therefore, to this end, a predetermined number or more of reception chips is required. Accordingly, also in a situation where the radar apparatus is required to be downsized, it is required to ensure a predetermined level of a hardware mounting space.

Figure 2:
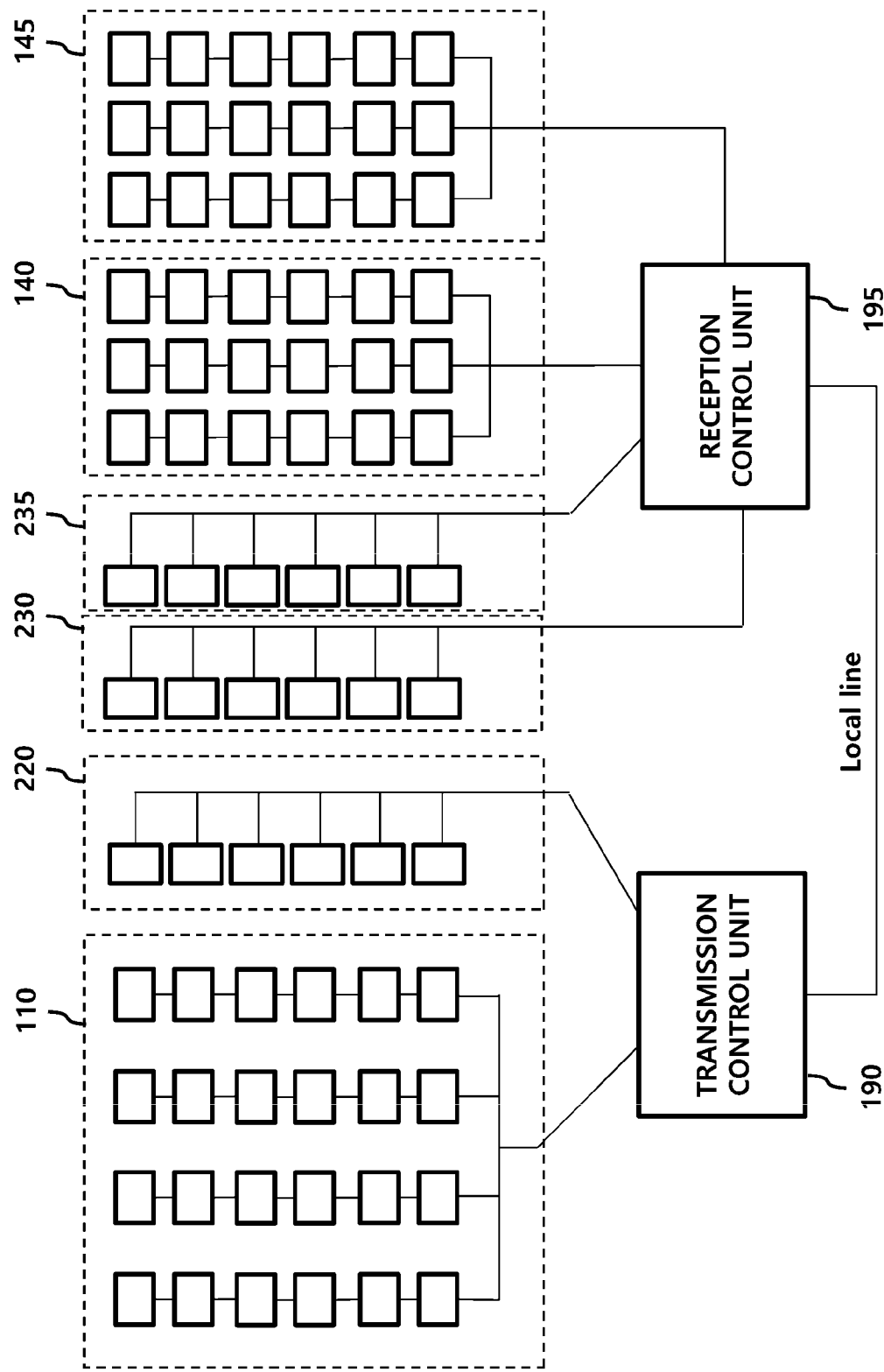
FIG. 2 is a view for explaining a polarization characteristic dividing configuration of a long-range antenna and a short-range antenna which may be applied to an exemplary embodiment of the present disclosure.

FIG. 2 is a view for explaining a polarization characteristic dividing configuration of a long-range antenna and a short-range antenna which may be applied to an exemplary embodiment of the present disclosure.

Referring to FIG. 2, the radar apparatus may be configured such that a transmission signal polarization characteristic of the short-range transmission antenna unit 220 is different from the transmission signal polarization characteristic of the long-range transmission antenna unit 110. For example, in the long-range transmission antenna unit 110, patch antennae are arranged to transmit a signal having a vertical polarization characteristic. In the short-range transmission antenna unit 220, patch antennae are arranged to transmit a signal having a horizontal polarization characteristic. In the meantime, the reception antenna for receiving a reception signal which is received by reflecting the transmission signal from the target may be configured by the same patch antenna arrangement as the transmission antenna unit to receive a reception signal having the same polarization characteristic as the transmission signal.

For example, in order to receive the reception signal having a horizontal polarization characteristic, the short-range reception antenna units 230 and 235 may be configured by the patch antenna disposed by the same arrangement as the short-range transmission antenna unit 220. Similarly, the long-range reception antenna units 140 and 145 may be configured by the same patch antenna arrangement as the long-range transmission antenna unit 110. The transmission control unit 190 and the reception control unit 195 control the transmission signal and the reception signal, respectively.

However, even though the long-range transmission signal and the short-range transmission signal are separately output depending on the polarization characteristics, it is necessary to maintain the number of channels in order to ensure a detection performance of the radar apparatus. Therefore, in order to maintain two short-range reception channels and two long-range reception channels, two short-range reception antenna units 230 and 235 and two long-range reception antenna units 140 and 145 are necessary and a total of four reception chips are required for each reception antenna unit. Therefore, even when the polarization characteristics of the long-range transmission signal and the short-range transmission signal are differently configured, it is difficult to reduce a hardware mounting space.

In order to solve the above-mentioned problem, the present disclosure suggests a method and an apparatus which may reduce the number of reception chips of the radar apparatus and reduce the hardware mounting space while maintaining the same number of channels.

Figure 3:
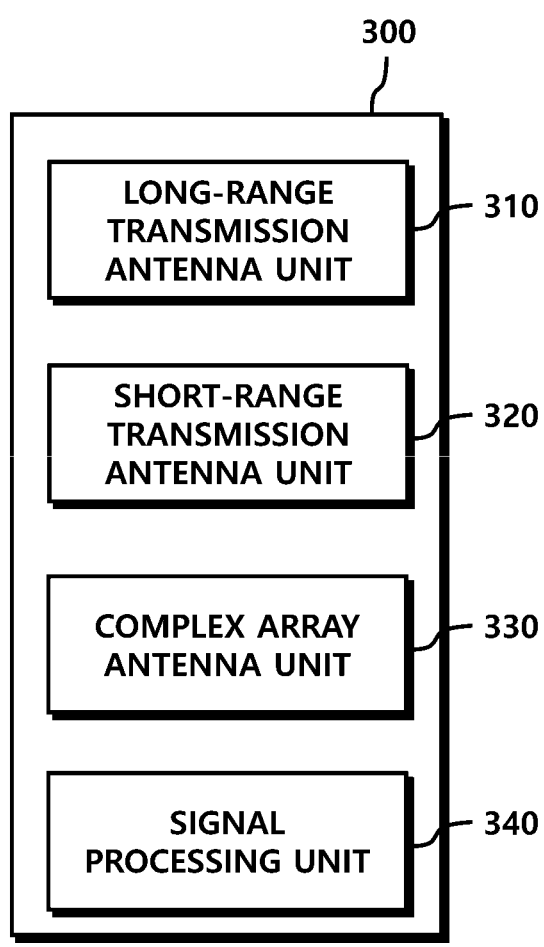
FIG. 3 is a view illustrating a configuration of a radar apparatus according to an exemplary embodiment of the present disclosure.

FIG. 3 is a view illustrating a configuration of a radar apparatus according to an exemplary embodiment of the present disclosure.

A radar apparatus 300 according to an exemplary embodiment of the present disclosure includes a long-range transmission antenna unit 310 including one or more long-range transmission array antennae which transmit a first polarized transmission signal, a short-range transmission antenna unit 320 including one or more short-range transmission array antennae which transmit a second polarized transmission signal, a complex array antenna unit 330 including one or more complex array antennae which receive a first polarized reception signal and a second polarized reception signal received by reflecting the first polarized transmission signal and the second polarized transmission signal from a target, respectively, and a signal processing unit 340 which detects the target using the first polarized reception signal and the second polarized reception signal. Further, the first polarized reception signal is configured to have a cross polarization characteristic with respect to the second polarized reception signal.

Referring to FIG. 3, the long-range transmission antenna unit 310 transmits a transmission signal which forms a narrow field of view (FOV) to detect a long-range target. That is, in order to form a narrow beam pattern in a vertical direction and a horizontal direction, the long-range transmission antenna unit 310 is configured by one or more long-range transmission array antennae. Further, if necessary, a plurality of long-range transmission antenna units 310 may be configured. When the patch antennae are arranged in a vertical direction, as the number of patch antennae is increased, a vertical FOV is reduced. Similarly, when the patch antennae are arranged in a horizontal direction, as the number of patch antennae is increased, a horizontal FOV is reduced. Accordingly, the long-range transmission antenna unit 310 includes a sub array antenna in which a plurality of patch antennae is vertically arranged and a plurality of sub array antennae may be horizontally formed.

For example, the long-range transmission antenna unit 310 includes two or more sub array antennae which are branched on the same micro-strip line. Each of the two or more sub array antennae may be configured to radiate a signal having the same polarization characteristic. The micro-strip line is a line which applies a signal, a voltage, or a current to each patch antenna and is used as a meaning including a terminology such as a transmission line or a feed line.

In the meantime, the short-range transmission antenna unit 320 transmits a transmission signal which forms a broad FOV to detect a short-range target. For example, the short-range transmission antenna unit 320 may be configured by a smaller number of sub array antennae than that of the long-range transmission antenna unit 310 in order to ensure a broad FOV in a horizontal direction.

The long-range transmission antenna unit 310 and the short-range transmission antenna unit 320 transmit a transmission signal having a polarization characteristic. The long-range transmission antenna unit 310 may transmit a first polarized transmission signal and the short-range transmission antenna unit 320 may transmit a second polarized transmission signal. For example, as described with reference to FIG. 2, the first polarized transmission signal and the second polarized transmission signal may have a 90-degree polarization characteristic difference. For example, the first polarized transmission signal has a vertical polarization characteristic and the second polarized transmission signal has a horizontal polarization characteristic. As another example, the first polarized transmission signal has a 45 degrees left polarization characteristic and the second polarized transmission signal has a 45 degrees right polarization characteristic. In addition, the first polarized transmission signal and the second polarized transmission signal have a cross polarization characteristic. The cross polarization refers to a polarization component which is vertical to a specific polarization component and means that a difference in the polarization characteristic between two signals is 90 degrees.

In the meantime, the complex array antenna unit 330 may receive the first polarized reception signal received by reflecting the first polarized transmission signal from the target. Further, the complex array antenna unit 330 may also receive the second polarized reception signal received by reflecting the second polarized transmission signal from the target. To this end, the complex array antenna unit 330 includes one or more complex array antennae which receive both the first polarized reception signal and the second polarized reception signal.

The complex array antenna includes two or more sub array antennae which are branched on the same micro-strip line and each of the two or more sub array antennae may be configured to receive signals having different polarization characteristics. That is, the complex array antenna includes a plurality of sub array antennae which is branched from one micro-strip line. In at least one of the plurality of sub array antennae, patch antennae are arranged to receive the first polarized reception signal and in the remaining sub array antennae, patch antennae are arranged to receive the second polarized reception signal. That is, one complex array antenna may be configured to receive both signals having a polarization difference of 90 degrees. In the following description, a sub array antenna configured to receive the first polarized reception signal will be described as a first polarization sub array antenna and a sub array antenna configured to receive the second polarized reception signal will be described as a second polarization sub array antenna.

In the meantime, the signal processing unit 340 may detect a long-range target and a short-range target using the first polarized reception signal and the second polarized reception signal. To this end, the signal processing unit 340 may include a signal distributer which separately processes the first polarized reception signal and the second polarized reception signal even when both the first polarized reception signal and the second polarized reception signal are received by means of one complex array antenna. For example, even when two or more signals having a cross polarization characteristic are received by means of one complex array antenna, the two or more signals may be processed using a signal distributor such as a circulator divider.

Hereinafter, a configuration and an operation of a radar apparatus which processes signals having a cross polarization characteristic using the above-described complex array antenna will be described in detail with reference to the drawings.

Figure 4:
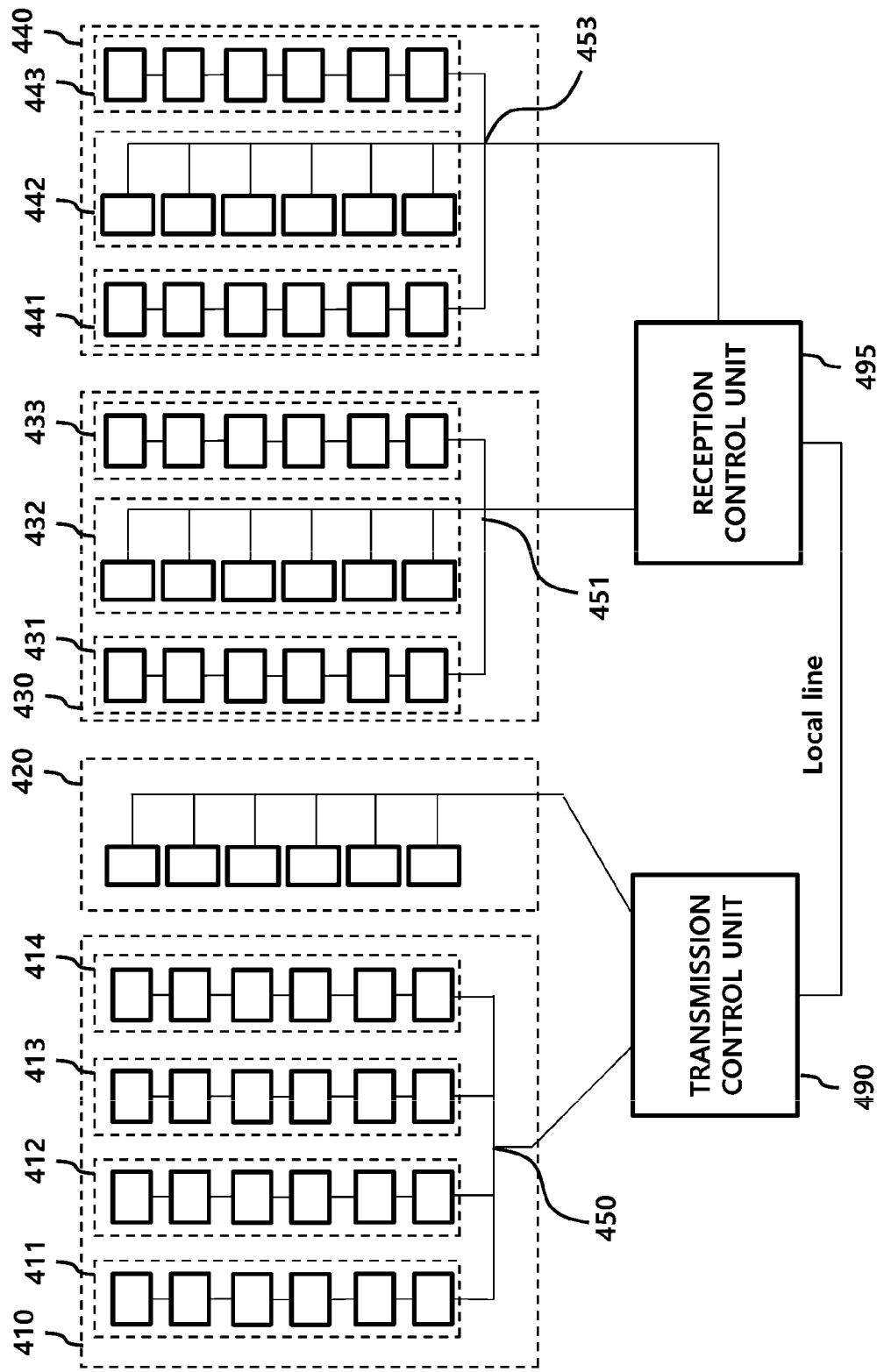
FIG. 4 is a view illustrating a structure of a radar apparatus using vertical polarization and horizontal polarization according to an exemplary embodiment of the present disclosure.

FIG. 4 is a view illustrating a structure of a radar apparatus using vertical polarization and horizontal polarization according to an exemplary embodiment of the present disclosure.

Referring to FIG. 4, a radar apparatus 300 according to an exemplary embodiment of the present disclosure may include two complex array antennae 430 and 440. Further, the radar apparatus 300 includes one long-range transmission array antenna 410 and one short-range transmission array antenna 420. However, this is for convenience of description and the number of the long-range transmission array antennae 410, the short-range transmission antennae 420, and the complex array antennae 430 and 440 is not limited thereto. In the meantime, the radar apparatus 300 includes a transmission control unit 490 which controls a transmission signal and a reception control unit 495 which processes a reception signal. The reception control unit 495 may perform a function of the above-described signal processing unit 340.

The long-range transmission array antenna 410 includes four sub array antennae 411, 412, 413, and 414 to implement a narrow FOV. The four sub array antennae 411, 412, 413, and 414 are branched from a branch point 450 on the same micro-strip line to output the same first polarized transmission signal. The short-range transmission array antenna 420 includes one sub array antenna to implement a broad FOV in the horizontal direction. In the meantime, the short-range transmission array antenna 420 outputs a second polarized transmission signal having a horizontal polarization characteristic. Therefore, in the long-range transmission array antenna 410 and the short-range transmission array antenna 420, patch antennae are arranged to output a transmission signal having a cross polarization characteristic.

Further, as illustrated in FIGS. 1 and 2, the radar apparatus 300 according to the exemplary embodiment of the present disclosure may include two complex array antennae 430 and 440 to maintain a detection performance by configuring four reception channels. Specifically, the first complex array antenna 430 includes two first polarization sub array antennae 431 and 433 and one second polarization sub array antenna 432. The first polarization sub array antennae 431 and 433 receive the first polarized reception signal and the second polarization sub array antenna 432 receive the second polarized reception signal. To this end, in the first polarization sub array antennae 431 and 433, the patch antennae may be arranged by the same arrangement pattern as the long-range transmission antenna 410. Further, in the second polarization sub array antenna 432, the patch antennae may be arranged by the same arrangement pattern as the short-range transmission antenna 420. Similarly to the first complex array antenna 430, the second complex array antenna 440 includes two first polarization sub array antennae 441 and 443 and one second polarization sub array antenna 442.

In the meantime, the first polarization sub array antenna 431 and 433 or 441 and 443 and the second polarization sub array antenna 432 or 442 may be configured to be branched from a branch point 451 or 453 on the same micro-strip line.

By doing this, both the first polarized reception signal and the second polarized reception signal are received by one complex array antenna 430 or 440. Further, the second polarized reception signal is received by means of two complex array antennae 430 and 440 so that two channels may be configured. Similarly, the first polarized reception signal is also received by means of two complex array antennae 430 and 440 so that two channels may be configured. Therefore, the radar apparatus 300 according to the exemplary embodiment of the present disclosure implements a total of four channels as illustrated in FIGS. and 2 and uses two complex array antennae so that a hardware space for a reception chip may be reduced while suppressing deterioration of a radar performance only by two reception chips. By doing this, down-sizing of the radar apparatus may be implemented.

Even though the number of sub array antennae of the complex array antennae 430 and 440 is described as an example, the number of sub array antennae is not limited thereto.

Figure 5:
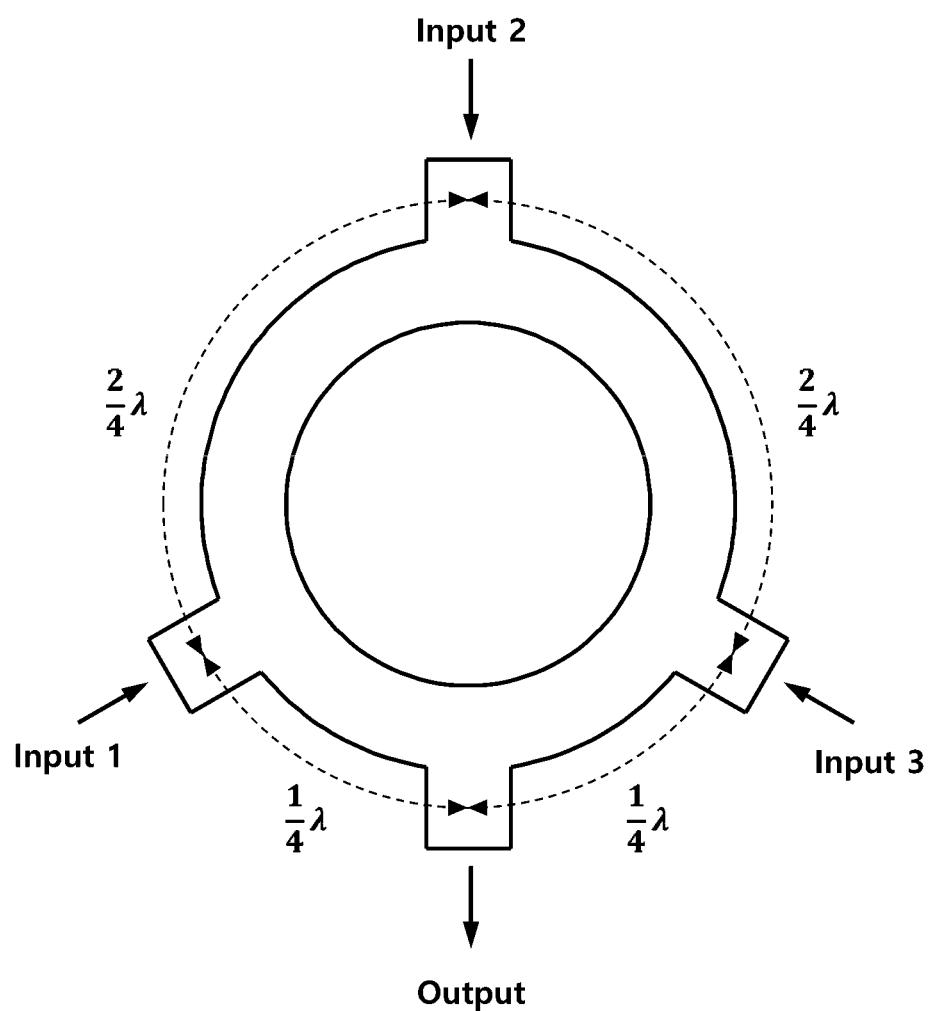
FIG. 5 is a view illustrating a structure of a circulator divider for complex array antenna signal processing according to an exemplary embodiment of the present disclosure.

FIG. 5 is a view illustrating a structure of a circulator divider for complex array antenna signal processing according to an exemplary embodiment of the present disclosure.

As described above, a radar apparatus according to an exemplary embodiment of the present disclosure receives both a first polarized reception signal for long-range detection and a second polarized reception signal for short-range detection by means of one complex array antenna. Therefore, a configuration which separately processes the first polarized reception signal and the second polarized reception signal may be necessary.

Referring to FIG. 5, a circulator divider is configured by three input ports and one output port. Referring to FIG. 4 again, a signal of the first polarization sub array antenna 431 is input to an input port 1 (Input 1) of the circulator divider configured in the first complex array antenna 430. A signal of the second polarization sub array antenna 432 is input to an input port 2 (Input 2). A signal of the first polarization sub array antenna 433 is input to an input port 3 (Input 3). The first polarization sub array antenna and the second polarization sub array antenna receive the first polarized reception signal and the second polarized reception signal having a cross polarization characteristic, respectively, so that even when the first polarized reception signal and the second polarized reception signal are received at the same timing, the circulator divider separately outputs the first polarized reception signal and the second polarized reception signal. For example, the first polarized reception signals having the same polarization characteristic are received at the input port 1 and the input port 3 to be output to an output port. The input port 1 and the input port 3 are spaced apart from the output port with the same interval to output the first polarized reception signals as one signal. In contrast, the second polarized reception signal is input to the input port 2. A difference between a distance between the input port 2 and the output port and a distance between the input port 1 or 3 and the output port is a half wavelength. Therefore, one reception chip processes the first polarized reception signal and the second polarized reception signal using a signal which is output to one output port to detect the long-range target and the short-range target. The circulator divider is disclosed as an example for the convenience of description and the number of input ports of the circulator divider may vary depending on the number of sub array antennae of the complex array antenna.

Figure 6:
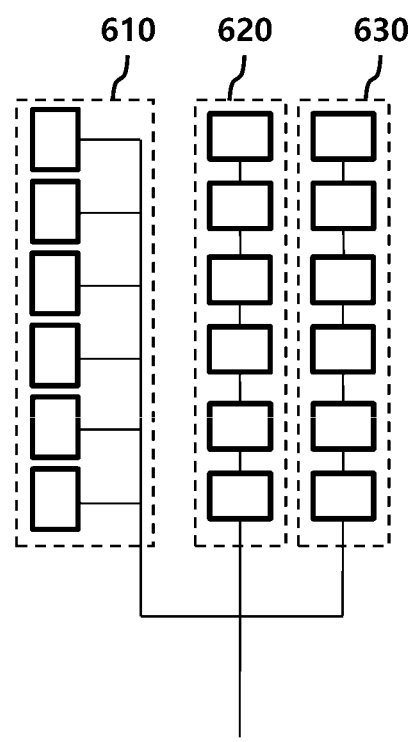
FIG. 6 is a view illustrating a structure of a complex array antenna according to an exemplary embodiment of the present disclosure.

FIG. 6 is a view illustrating a structure of a complex array antenna according to an exemplary embodiment of the present disclosure.

Referring to FIG. 6, there is another example in which one complex array antenna includes first polarization sub array antennae 620 and 630 and a second polarization sub array antenna 610. That is, in FIG. 4, even though it is described that the second polarization sub array antenna 432 or 442 is located between the first polarization sub array antennae 431 and 433 or 441 and 443 as an example, the second polarization sub array antenna 610 may be configured on one side.

In the meantime, the number of first polarization sub array antennae 620 and 630 may be equal to or larger than the number of second polarization sub array antennae 610. The long-range transmission antenna includes a plurality of sub array antennae for implementation of a narrow FOV. Therefore, in order to receive a first polarized reception signal for the first polarized transmission signal which is transmitted by the long-range transmission antenna, the number of first polarization sub array antennae 620 and 630 may be larger than the number of second polarization sub array antenna 610.

In the meantime, when two or more complex array antennae are implemented in the radar apparatus, in order to detect a long-range target by implementing the narrow FOV, it is necessary to maintain an interval between reception channels to be equal to or higher than a predetermined level. In contrast, in order to detect a short-range target by implementing the broad FOV, it is necessary to maintain the interval between reception channels to be equal to or lower than a predetermined level. To this end, when two or more complex array antennae are configured, in the radar apparatus according to the exemplary embodiment of the present disclosure, sub array antennae may be disposed as illustrated in FIG. 7.

Figure 7:
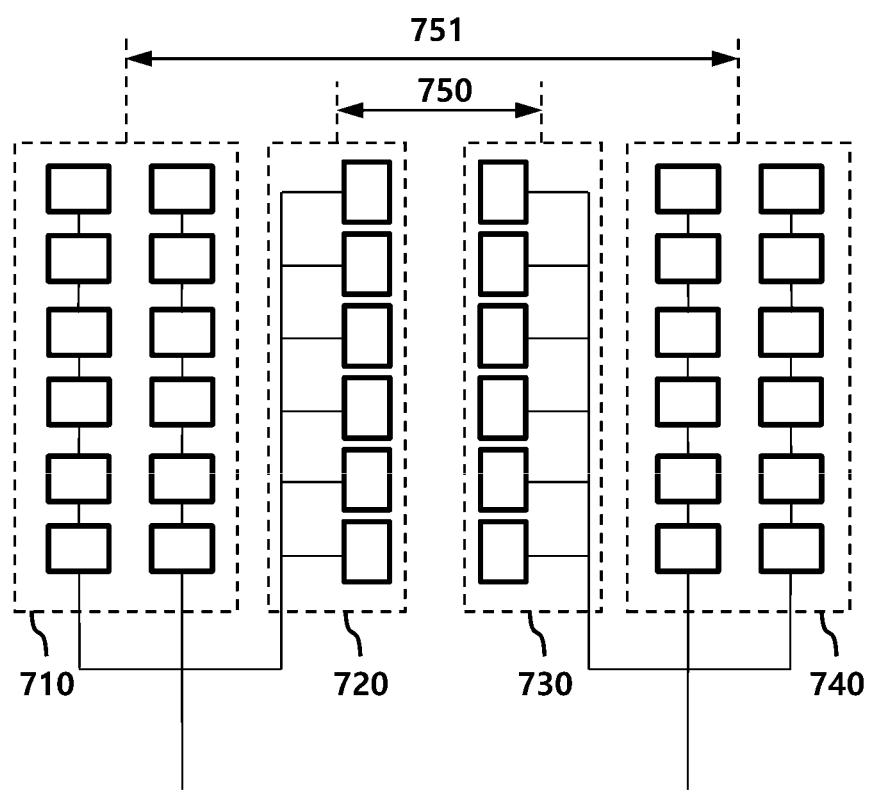
FIG. 7 is a view illustrating a sub array antenna arrangement of a complex array antenna according to an exemplary embodiment of the present disclosure.

FIG. 7 is a view illustrating a sub array antenna arrangement of a complex array antenna according to an exemplary embodiment of the present disclosure.

Referring to FIG. 7, when the complex array antenna unit includes two or more complex array antennae, each of the complex array antennae includes first polarization sub array antenna groups 710 and 740 and second polarization sub array antenna groups 720 and 730. Further, a distance 751 between the first polarization sub array antenna groups may be equal to or longer than a distance 750 between the second polarization sub array antenna groups.

For example, two or more first polarization sub array antennae 710 which are configured in one complex array antenna to receive the first polarized reception signal and two or more first polarization sub array antennae 740 which are configured in another complex array antenna to receive the first polarized reception signal are spaced apart from each other with a predetermined distance 751. Further, one or more second polarization sub array antennae 720 which are configured in one complex array antenna to receive the second polarized reception signal and one or more second polarization sub array antennae 730 which are configured in another complex array antenna to receive the second polarized reception signal are spaced apart from each other with a predetermined distance 750. In this case, the interval 751 between the first polarization sub array antenna groups may be equal to or longer than the interval 750 between the second polarization sub array antenna groups.

In the meantime, when the narrow FOV is implemented to detect a long-range target, side lobe may be significantly generated. The side lobe may be reduced using a beam waveform of a transmission signal for detecting a short-range target.

Figure 8:
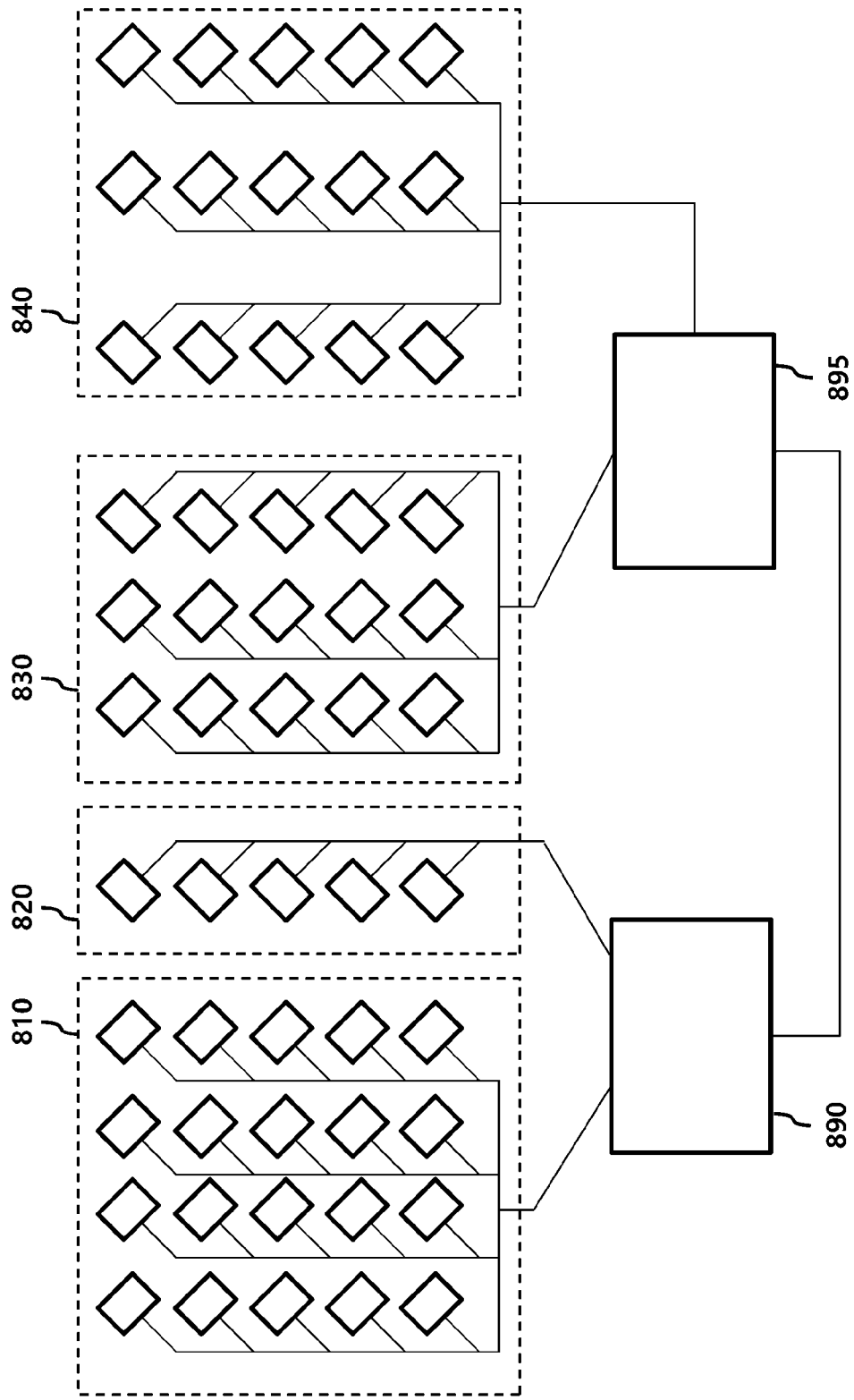
FIG. 8 is a view illustrating a structure of a radar apparatus using 45 degrees polarization according to an exemplary embodiment of the present disclosure.

It has been described above that the first polarized transmission signal and the first polarized reception signal have the vertical polarization characteristic and the second polarized transmission signal and the second polarized reception signal have the horizontal polarization characteristic. In FIG. 8, examples having a 45 degrees left polarization characteristic and a 45 degrees right polarization characteristic will be described.

FIG. 8 is a view illustrating a structure of a radar apparatus using 45 degrees polarization according to an exemplary embodiment of the present disclosure.

Referring to FIG. 8, a long-range transmission signal and a short-range transmission signal are configured to have a cross polarization characteristic. For example, a long-range transmission antenna unit 810 may include one or more sub array antennae in which patch antennae arranged to have a 45 degrees right polarization characteristic are configured. In a short-range transmission antenna unit 820, patch antennae arranged to a 45 degrees left polarization characteristic may be configured. The transmission signal having a 45 degrees right polarization characteristic and the transmission signal having a 45 degrees left polarization characteristic show a 90 degrees polarization characteristic difference so that the transmission signals have a cross polarization characteristic.

Further, each complex array antenna 830 or 840 includes a first polarization sub array antenna to receive a first polarized reception signal having a 45 degrees right polarization characteristic and a second polarization sub array antenna to receive a second polarized reception signal having a 45 degrees left polarization characteristic in order to receive two transmission signals which are separately polarized through one complex array antenna 830 or 840. In the meantime, in order to maintain an interval between channels, the first polarization sub array antenna groups of the complex array antenna 830 and the first polarization sub array antenna groups of the complex array antenna 840 are disposed to be spaced apart from each other. Further, the second polarization sub array antenna groups of the complex array antenna 830 and the second polarization sub array antenna groups of the complex array antenna 840 are disposed to be close to each other.

In the meantime, the transmission control unit 890 which controls the transmission signal and the reception control unit 895 which processes the reception signal may be connected to each other through a local line.

As described above, the present disclosure provides a radar apparatus which transmits transmission signals having different polarization characteristics and receives reception signals having different polarization characteristics which are reflected from the target to be received by means of one complex array antenna. Further, the radar apparatus according to the exemplary embodiment of the present disclosure may ensure the number of the same reception channels while reducing the number of complex array antennae. By doing this, the number of reception chips configured for every antenna is reduced so that the size of the radar may be reduced while maintaining the radar detection performance. Further, each reception signal has a cross polarization characteristic, so that signal interference may be minimized.

Hereinafter, a radar signal processing method which performs all the above-described operations of the radar apparatus according to the exemplary embodiment of the present disclosure will be described with reference to the drawing.

Figure 9:
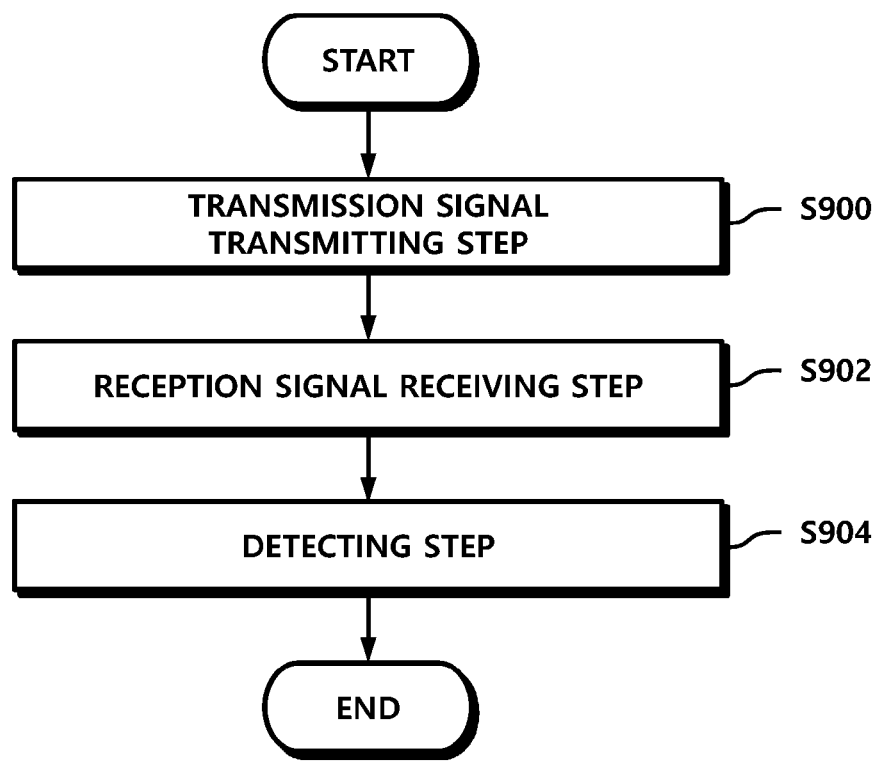
FIG. 9 is view for explaining a radar signal processing method according to an exemplary embodiment of the present disclosure.

FIG. 9 is view for explaining a radar signal processing method according to an exemplary embodiment of the present disclosure.

A radar signal processing method according to an exemplary embodiment of the present disclosure includes a transmission signal transmitting step of transmitting a first polarized transmission signal using one or more long-range transmission array antennae and transmitting a second polarized transmission signal using one or more short-range transmission array antennae, a reception signal receiving step of receiving a first polarized reception signal and a second polarized reception signal which are received by reflecting the first polarized transmission signal and the second polarized transmission signal from a target by means of one complex array antenna, and a detecting step of detecting the target using the first polarized reception signal and the second polarized reception signal. Further, the first polarized reception signal has a cross polarization characteristic with respect to the second polarized reception signal.

Referring to FIG. 9, the radar signal processing method includes a transmission signal transmitting step of transmitting a first polarized transmission signal using one or more long-range transmission array antennae and transmitting a second polarized transmission signal using one or more short-range transmission array antennae (S900). In the transmission signal transmitting step, the first polarized transmission signal and the second polarized transmission signal are transmitted using a long-range transmission array antenna and the short-range transmission array antenna which are configured to output signals having different polarization characteristics. The first polarized transmission signal and the second polarized transmission signal may have a cross polarization characteristic. Further, the long-range transmission array antenna may have two or more sub array antennae to implement a narrow FOV characteristic. The short-range transmission array antenna may have one or more sub array antennae to implement a broad FOV characteristic. The number of sub array antennae of the short-range transmission array antenna may be smaller than the number of sub array antennae of the long-range transmission array antenna.

Further, the radar signal processing method includes a reception signal receiving step of receiving a first polarized reception signal and a second polarized reception signal which are received by reflecting the first polarized transmission signal and the second polarized transmission signal from a target by means of one complex array antenna (S902). During the reception signal receiving step, both the first polarized reception signal and the second polarized reception signal are received using one complex array antenna. In this case, the first polarized reception signal and the second polarized reception signal have a cross polarization characteristic. For example, the first polarized reception signal has a vertical polarization characteristic and the second polarized reception signal has a horizontal polarization characteristic. Further, the complex array antenna includes two or more sub array antennae to receive all the signals having different polarization characteristics. For example, the complex array antenna may include a first polarization sub array antenna and a second polarization sub array antenna which are branched on the same micro-strip line. The first polarization sub array antenna may include patch antennae which are arranged to receive the first polarized reception signal and the second polarization sub array antenna may include patch antennae which are arranged to receive the second polarized reception signal. The second polarization sub array antenna may be disposed between the first polarization sub array antennae or on one side.

Further, when two or more complex array antennae are implemented, an interval between the first polarization sub array antenna groups may be set to be longer than an interval between the second polarization sub array antenna groups. The number of first polarization sub array antennae is larger than the number of second polarization sub array antennae so that an FOV appropriate for detecting a long-range and short-range target may be implemented.

Further, the radar signal processing method includes a detecting step of detecting the target using the first polarized reception signal and the second polarized reception signal (S904). During the detecting step, the long-range target and the short-range target may be detected using the first polarized reception signal and the second polarized reception signal which are received by means of one complex array antenna. To this end, during the detecting step, the long-range target and the short-range target may be detected using one reception chip using a signal divider such as a circulator divider. Alternatively, during the detecting step, the long-range target and the short-range target may be separately detected using the polarization characteristics of the first polarized reception signal and the second polarized reception signal which are received by means of one complex array antenna.

As described above, according to the present disclosure, signals for detecting the long-range and short-range targets are configured to have different polarization characteristics to process a reception signal using one reception antenna. Further, according to the present disclosure, the reception signal is processed using one reception antenna so that the same number of channels is maintained while reducing the reception antenna. Further, according to the present disclosure, the size of the radar apparatus is reduced while providing the same performance.

Even though all components of the exemplary embodiment of the present disclosure may be combined as one component or operates to be combined, the present disclosure is not limited to the exemplary embodiment. In other words, one or more of all of the components may be selectively combined to be operated within a scope of the purpose of the present disclosure. It will be appreciated that various exemplary embodiments of the present disclosure have been described herein for purposes of illustration, and that various modifications, changes, and substitutions may be made by those skilled in the art without departing from the scope and spirit of the present disclosure. The protective scope of the present disclosure should be construed based on the following claims, and all the technical concepts in the equivalent scope thereof should be construed as falling within the scope of the present disclosure.

What is claimed is:

1. A radar apparatus, comprising:
   a long-range transmission antenna unit including one or more long-range transmission array antennae which transmit a first polarized transmission signal;
   a short-range transmission antenna unit including one or more short-range transmission array antennae which transmit a second polarized transmission signal;
   a complex array antenna unit which includes a plurality of complex array antennae receiving a first polarized reception signal and a second polarized reception signal which are received by reflecting the first polarized transmission signal and the second polarized transmission signal from a target, each of the complex array antennae including first polarization sub array antenna groups and second polarization sub array antenna groups, wherein a distance between the first polarization sub array antenna groups is equal to or longer than a distance between the second polarization sub array antenna groups; and
   a signal processing unit which detects the target using the first polarized reception signal and the second polarized reception signal,
   wherein the first polarized reception signal has a cross polarization characteristic with respect to the second polarized reception signal.

2. The radar apparatus according to claim 1, wherein the first polarized transmission signal has a cross polarization characteristic with respect to the second polarized transmission signal.

3. The radar apparatus according to claim 1, wherein the long-range transmission array antenna includes two or more sub array antennae which are configured to be branched on the same micro-strip line and each of the two or more sub array antennae radiates a signal having the same polarization characteristic.

4. The radar apparatus according to claim 1, wherein the complex array antenna includes two or more sub array antennae which are configured to be branched on the same micro-strip line and each of the two or more sub array antennae is configured to receive signal having different polarization characteristics.

5. The radar apparatus according to claim 4, wherein the two or more sub array antennae includes one or more first polarization sub array antennae which receive the first polarized reception signal and one or more second polarization sub array antennae which receive the second polarized reception signal.

6. The radar apparatus according to claim 5, wherein the number of first polarization sub array antennae is equal to or larger than the number of second polarization sub array antennae.

7. A radar signal processing method, comprising:
   transmitting a first polarized transmission signal using one or more long-range transmission array antennae and transmitting a second polarized transmission signal using one or more short-range transmission array antennae;
   receiving a first polarized reception signal and a second polarized reception signal which are received by reflecting the first polarized transmission signal and the second polarized transmission signal from a target by one of a plurality of complex array antennae, each of the complex array antennae including first polarization sub array antenna groups and second polarization sub array antenna groups, wherein a distance between the first polarization sub array antenna groups is equal to or longer than a distance between the second polarization sub array antenna groups; and
   detecting the target using the first polarized reception signal and the second polarized reception signal,
   wherein the first polarized reception signal has a cross polarization characteristic with respect to the second polarized reception signal.

8. The radar signal processing method according to claim 7, wherein the first polarized reception signal is received by one or more first polarization sub array antennae included in the complex array antenna and
   the second polarized reception signal is received by one or more second polarization sub array antennae included in the complex array antenna.

9. The radar signal processing method according to claim 7, wherein during the detecting the target, the first polarized reception signal and the second polarized reception signal which are received by the one of the plurality of complex array antennae are separated using the polarization characteristic and
   a long-range target is detected using the first polarized reception signal and a short-range target is detected using the second polarized reception signal.

10. A radar apparatus, comprising:
    a first complex array antenna unit including a first polarization sub array antenna group including one or more first polarization sub array antennae which receive a first polarized reception signal and a second polarization sub array antenna group including one or more second polarization sub array antennae which receive a second polarized reception signal; and
    a second complex array antenna unit including a first polarization sub array antenna group including one or more first polarization sub array antennae which receive a first polarized reception signal and a second polarization sub array antenna group including one or more second polarization sub array antennae which receive a second polarized reception signal, wherein a distance between the first polarization sub array antenna group of the first complex array antenna unit and the first polarization sub array antenna group of the second complex array antenna unit is longer than a distance between the second polarization sub array antenna group of the first complex array antenna unit and the second polarization sub array antenna group of the second complex array antenna unit.

11. The radar apparatus according to claim 10, wherein the first polarization sub array antenna group of the first complex array antenna unit and the first polarization sub array antenna group of the second complex array antenna unit are disposed to be spaced apart from each other and the second polarization sub array antenna group of the first complex array antenna unit and the second polarization sub array antenna group of the second complex array antenna unit are disposed to be close to each other.

12. The radar apparatus according to claim 10, wherein the number of first polarization sub array antennae included in the first polarization sub array antenna group of the first complex array antenna unit is larger than the number of second polarization sub array antennae included in the second polarization sub array antenna group of the first complex array antenna unit.

13. The radar apparatus according to claim 10, wherein the first polarization sub array antennae included in the first polarization sub array antenna group of the first complex array antenna unit and the second polarization sub array antennae included in the second polarization sub array antenna group of the first complex array antenna unit are branched on the same micro-strip line.

14. The radar apparatus according to claim 10, wherein the first polarized reception signal has a cross polarization characteristic with respect to the second polarized reception signal.

15. The radar apparatus according to claim 10, further comprising:

a transmission array antenna unit including a long-range transmission array antenna group including one or more long-range transmission array antenna which transmits a first polarized transmission signal and a short-range transmission array antenna group including one or more short-range transmission array antenna which transmits a second polarized transmission signal.

* * * * *